INVENTOR
Daniel Rhee

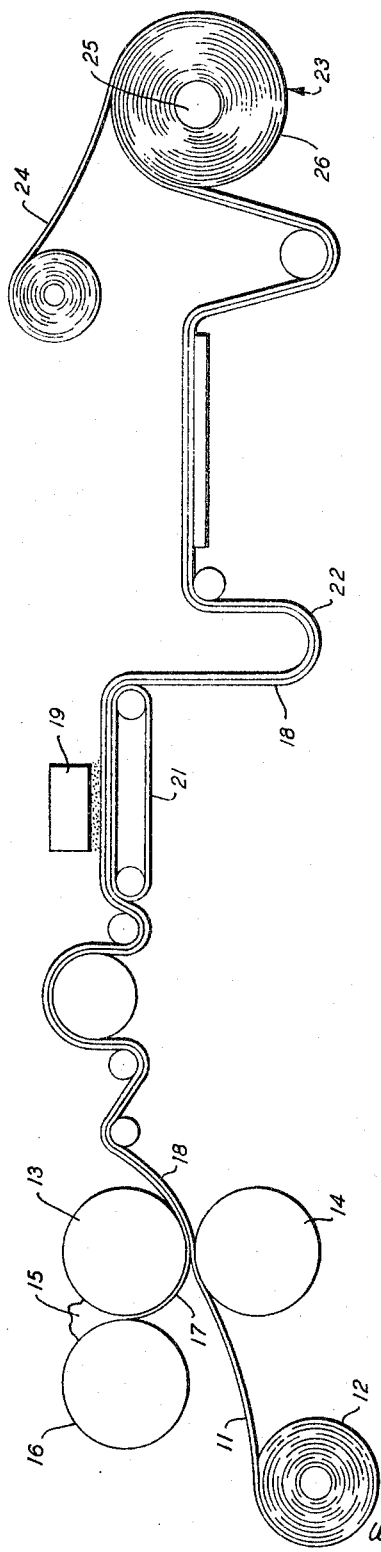

United States Patent Office

3,264,155
Patented August 2, 1966

1

3,264,155
METHOD OF MAKING EXTENSIBLE FABRIC
Daniel Rhee, Warren, R.I., assignor to Rohm & Haas Company, Philadelphia, Pa., a corporation of Delaware
Filed May 5, 1961, Ser. No. 110,297
2 Claims. (Cl. 156—160)

This application is a continuation-in-part of my copending application Serial No. 847,345 filed October 19, 1959, entitled "Extensible Fabric," and now abandoned.

This invention relates to elastic fabric material, and, more particularly, to a method of making rubber-coated fabric which is extensible in all directions.

The textile industry has long been confronted with a need for a commercially acceptable fabric which is universally stretchable, i.e. extensible to a substantial degree in all edgewise directions. Various composite rubber and fabric materials have heretofore been available, but have failed to enjoy favorable consumer response because of certain attendant disadvantages. In general, such fabrics have been insufficiently extensible in one or more directions and have been characterized by a rubbery rather than a fabric appearance and feel.

Many attempts have been made by the prior art to make a satisfactory fabric-rubber laminated material using a fabric base which in its relaxed state is highly extensible in one direction, but only slightly extensible in other directions, particularly that normal to the direction of greatest extensibility. In foundation garments for example, insufficient extensibility in one direction causes the skirt of the garment to creep or curl up.

In an effort to compensate for the low extensibility in a particular direction, the fabric has been condensed in that direction prior to the curing of the rubber backing so that upon curing, the fabric in the composite material is held condensed by the rubber. Both the methods of making such materials and the materials themselves have been characterized by many disadvantages. The condensing steps are time-consuming and expensive. The resulting material is frequently lacking in smoothness because of the failure to maintain complete uniformity in condensation or failure to retain all parts of the material uniformly condensed. A smooth fabric-like appearance and feel is critically important because of consumer insistence upon such characteristics, in spite of whatever advantages might otherwise be present.

There has become available relatively recently certain fabric making techniques which result in products having great flatwise extensibility in all directions. An example of such material is interlock knit Helanca nylon. Such material, while possessing the requisite stretch characteristic does not lend itself to lamination with rubber by heretofore available techniques. The handling of the fabric during the application of the rubber presents a particularly troublesome problem. Material which is relatively non-extensible in at least one direction does not present the same difficulty because it may be held in tension during the laminating process without affecting the uniformity of appearance of the fabric in the finished product. Where substantial tension is applied during the laminating process to universally stretchable material, however, not only does the resulting distortion make uniformity more difficult to obtain, but the extensibility of the finished product is diminished.

Further, conventional techniques have proved unsuccessful in laminating universally stretchable Helanca nylon fabric to rubber because the nylon has been stained and discolored in the course of manufacture. Specifically the nylon turns yellow.

Efforts have been made to impart a fabric-like rather than a rubbery appearance to the rubber face of the composite material by impressing a design on such face. Such impressing, however, frequently causes distortion or damage to the threads of the underlying fabric. The result was to affect adversely both the appearance and strength of the fabric. Moreover, in certain prior techniques, the rubber and/or adhesive used to attach it to the fabric have penetrated the fabric to the degree that the appearance of the fabric face has been rubbery or at least non-uniform.

To overcome the disadvantages of the prior art, it is an object of the present invention to provide a universally stretchable rubber-fabric laminated material characterized by an appearance and feel so closely resembling non-rubberized fabrics as to enjoy consumer acceptance and an improved method for making the same.

More specifically, it is an object of this invention to provide a material comprising a fabric base bonded to a rubber backing, which material is extensible at least about 80 percent beyond any edge-to-edge dimension of the material and an improved method of making it.

It is another object of the invention to provide such a material and method wherein the rubber layer is provided with an indented surface design to provide a fabric-like appearance without distorting or otherwise damaging the underlying fabric.

It is a further object of the invention to obtain a universally stretchable rubber-backed fabric which may be cut, sewn, and subjected to other garment fabrication operations without damaging the material or materially altering its extensibility.

Generally, the invention includes the method of making a rubber coated fabric material which comprises feeding in a longitudinal direction a web of fabric material which in a relaxed state is extensible at least about 80 percent beyond any normal relaxed flatwise dimension, longitudinally feeding and pressing into face-to-face adhering relationship with said fabric web a freshly calendered web of hot uncured vulcanizable rubber, and vulcanizing said rubber to form a strongly adhering composite material, controlling flatwise dimensional change of said fabric throughout all of said steps so that said composite material is resiliently extensible at least about 80 percent beyond any normal flatwise dimension.

Moreover, the invention contemplates the method wherein the dimensional change of said fabric is controlled so that said fabric occupies in said composite material substantially the same area it would occupy in a relaxed state apart from said rubber.

The invention having been generally described, preferred specific embodiments thereof will now be discussed in detail with reference to the accompanying drawing in which:

FIGURE 3 is a schematic representation of a specific series of method steps according to the invention.

Figure 1:
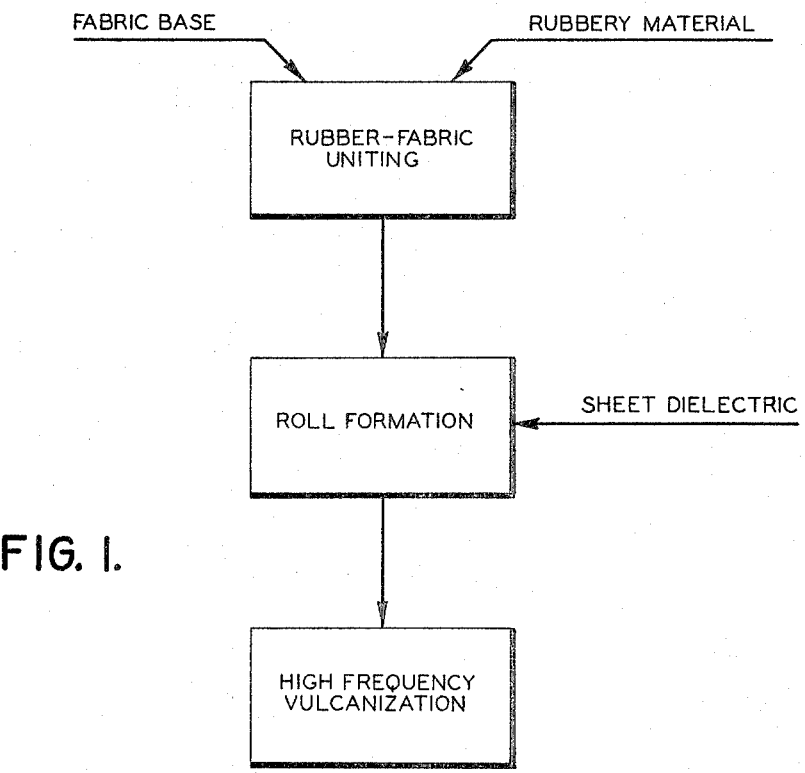
FIGURE 1 is a schematic representation of method steps according to the invention.

As shown in FIGURE 1, a fabric base and a layer of rubber are brought into face-to-face relationship at a rubber-fabric uniting station. The fabric material is of close texture and is extensible flatwise in all directions. Satisfactory results are obtained where the fabric is extensible at least 80 percent beyond any normal edge-to-edge dimension, i.e., along any flatwise dimension—lengthwise, widthwise and along any diagonal. Preferably the fabric material is extensible at least 100 percent beyond any normal edge-to-edge dimension. Particularly preferred is material which is stretchable lengthwise and widthwise to an approximately equal degree. A preferred specific fabric material is interlock knit Helanca nylon.

Rubber is banded to the fabric at a rubber-fabric uniting station. The rubber material which is employed in the process is in the form of a thin non-porous sheet of hot, uncured vulcanizable rubber. It will be understood that the term rubber as employed herein embraces not only natural rubber but any other natural or synthetic material having the general characteristics of rubber.

Preferably the rubber is formed into the requisite thin sheet by a calendering operation and immediately thereafter while still in a heated and softened state brought into face-to-face relationship with the fabric.

One specific vulcanizable rubber composition which may be satisfactorily employed in the invention is as follows:

| Constituent: | Parts by weight |
| --- | --- |
| Rubber (solid wt.) | 100.0 |
| Antioxidant | 0.5 |
| Wax | 1.0 |
| Titanium dioxide | 20.0 |
| Silica | 3.0 |
| Lime | 0.5 |
| | 125.0 |

Approximately two parts by weight of benzoyl peroxide or dicumyl peroxide may be added to the rubber to insure non-staining of the fibers in the fabric base.

The thickness of the rubber sheet desirably is approximately .01 inch but may vary from about .005 inch to about .020 inch.

The rubber and fabric may be brought together at the uniting station between a pair of opposed rollers which apply slight pressure to cause the rubber to adhere to the fabric. The composite web is then fed through a cooling mechanism such as a series of cooling rollers.

After the exposed rubber face is dusted with talc, a thin sheet of dielectric material such as paper is brought into face-to-face contact with the rubber face. A preferred dielectric material is glassine paper. The dielectric material has formed on its surface facing the rubber a cameo fabric-like design. The fabric-like design does not necessarily precisely resemble a woven or knitted fabric but may be any design which, when applied to the rubber face of the composite material, imparts a more fabric-like appearance to the rubber. The rubber-fabric web together with the paper dielectric is then wound into a roll preparatory to vulcanization.

Vulcanization is effected by dielectrically heating the uncured rubber in the roll to a vulcanizing temperature by positioning the roll in a high frequency electric field for a time period requisite to vulcanize the rubber and to imprint the fabric-like design of the dielectric material on the surface of the rubber. The specific vulcanizing operation may be as set forth in United States Patent 2,703,436.

In the uniting, roll forming and vulcanization steps, it is important to control the pressure by which rubber and fabric layers, and later these two layers and the dielectric material, are forced together. It is desirable to exert as little pressure as possible consistent with the obtaining of an adequate bond between the rubber and fabric. There should be very little penetration of the rubber into the fabric so that no rubber will be visible from the fabric face of the material and the threads in the fabric pattern are not displaced from their normal pattern by having rubber squeezed therebetween.

Further, the height of the cameo design on the dielectric material should be substantially less than the thickness of the rubber. Such height and the pressure in the roll forming and vulcanizing steps should be controlled so that a corresponding intaglio design is imprinted on the surface of the rubber to a depth substantially less than the thickness of the rubber without distorting or otherwise damaging the threads of the underlying fabric.

The fabric, rubber and dielectric should be maintained in the roll until the rubber has cooled substantially below the temperature at which it will flow to prevent fading of the intaglio design when the dielectric is removed from the rubber.

Figure 2:
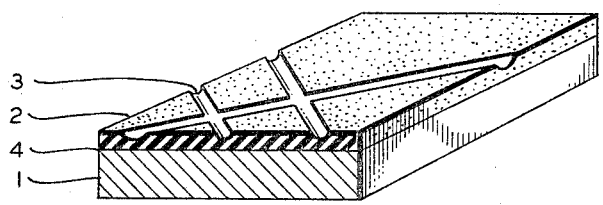
FIGURE 2 is a diagrammatic cross-sectional view of a composite fabric according to the invention.

Upon removing the roll from the high frequency field and unrolling it, a garment material is presented, including, as shown in FIGURE 2, an extensible fabric base 1, and a substantially unstressed, thin, non-porous rubbery layer 2, which layer is shallow embossed on its surface as at 3 and bonded to the fabric base at 4 with overall non-permeating engagement.

Preferably no foreign adhesive material is applied between the rubber and the fabric but instead sole reliance is placed upon the direct bond between the rubber and the fabric which occurs as a result of vulcanization. The use of adhesives is less desirable because such material tends to penetrate between the fabric threads and may become visible from the fabric face and even cause discoloration of the fabric.

Acetophenone, a decomposition product resulting from the heat generated during vulcanization, may be readily extracted by thoroughly scouring the material in a hot dilute solution of potassium oleate or sodium oleate.

The method of the present invention enables interlock knit Helanca nylon to be bonded with rubber in such manner as to produce a composite material which is resiliently stretchable flatwise at least 80 percent beyond any normal edge-to-edge dimension of the relaxed material. The fabric is not turned yellow or otherwise discolored or stained during the process. Preferably, the fabric retains its full extensibility in the composite product occupying in the latter an area substantially equal to the area it would normally occupy in a relaxed state unbonded to the rubber material. The fabric face presents a uniform and smooth appearance with no rubber visible through such face. The rubber face with its shallow intaglio fabric-like design also presents a general appearance akin to fabric. The overall appearance and feel of the finished composite product approaches that of chamois. The overall surface bonding of the rubber and fabric base so stabilizes the fibers of the fabric that the composite material may be stitched, cut or otherwise subjected to garment fabrication operations without inducing separation or unravelling of the fabric fibers. Because the rubber layer is substantially unstressed in the finished product, such fabrication operations do not tend to tear the rubber. The intaglio pattern is durable and resistant to wear and has no tendency to fade.

The fabric produced according to the invention is ideally suited for such purposes as foundation garments, bathing suits, hospital sheets and other related items.

A specific series of steps for effecting the fabric-rubber uniting and forming the composite sheet into a roll for purposes of vulcanization is illustrated in FIGURE 3. A fabric web 11 is fed from a roll 12 between a pair of rollers 13 and 14 where it is united with rubber. Generally a slight amount of tension is necessarily applied to the fabric web 11 so that it enters between the rollers 13 and 14 in a slightly stretched condition. Where the roller 12 is an idler roller sufficient tension must be applied to the web 11 to accomplish the necessary feeding. Alternatively, the roller 12 may be positively driven to minimize the tension to which the fabric web 11 is subjected. Where the roller 12 is driven at a speed such that the linear speed of the fabric is at least as great as the surface speed of the rollers 13 and 14 stretching of the fabric 11 is minimized.

Raw rubber 15 is calendered between calender rollers 13 and 16 according to conventional procedure. The resulting web 17 of freshly calendered rubber is fed around the surface of the roller 13 where it is united with the fabric web 11 between rollers 13 and 14. Desirably the longitudinal dimension of the rubber web 17 is maintained unchanged from its emergence from between the nip of the calender rollers until it is united with the fabric between the rollers 13 and 14. The rollers 13 and 14 apply slight pressure to the fabric-rubber composite so that the materials adhere together. Insufficient pressure is applied, however, to cause any material degree of penetration of rubber into the fabric. The composite material 18 is fed around a series of rollers to permit the rubber to cool and then is moved to a dusting station 19 where a coating of talc or similar material is applied to the outer face of the rubber web 17. The composite material is fed through the dusting station by an endless conveyor 21. After the composite material 18 leaves the dusting station 19 it is permitted to fall into a slack loop 22. The purpose of the formation of slack in the composite material is to permit the rubber to slightly contract in a longitudinal direction thus compensating at least in part for the slight stretching of the fabric material 11 prior to the uniting operation. Preferably the contraction of the rubber reduces the length of the fabric to its original relaxed length before bonding to the rubber. This phenomenon of rubber contraction occurs due to the "nerve" of calendered rubber which causes it to contract slightly in a longitudinal direction and to expand slightly in a lateral direction. Desirably the flatwise dimensions of the fabric are controlled so that the fabric occupies in the finished composite material substantially the same area it would occupy in a relaxed state unbonded to said rubber. This result can be obtained by controlling the initial tension applied to the fabric in relation to the later contraction of the rubber to return the fabric to its initial dimensions. If the fabric is not returned to its precise original dimensions it is generally better for the fabric to remain slightly stretched beyond its original length than to be condensed longitudinally. The composite material 18 is then fed to a roll formation station 23 where a web of dielectric material 24, as previously described, is fed into face-to-face relationship with the rubber face of the composite web 18 thereby sandwiching the rubber between the fabric and the dielectric material to form a three-ply composite. Such three-ply composite is then wound on a roller 25 until a roll 26 of desired thickness is completed. The composite material 18 and the dielectric 24 are then severed and the roll 26 is removed for transportation to the high frequency vulcanization station as previously described.

Occasionally it may be desirable to increase the extensibility of the fabric material in a particular direction beyond the normal before vulcanization of the rubber. For example, it may be desired to equalize the lengthwise and widthwise stretchability of the fabric. To that end the fabric may be subjected to pretensioning or condensing prior to the roll embossing and vulcanization steps. Because the fabric in its relaxed condition is highly extensible in all directions, however, the pretensioning and condensing with their attendant disadvantages may be kept to a minimum. The fabric may be extended in one direction, say widthwise by conventional expander rolls or tenter frames, as described, for example, in United States Patent 2,434,111. Such widthwise expansion may also be accompanied, if desired, by positive condensing lengthwise of the fabric. By so prestressing the fabric, its widthwise stretchability is reduced and lengthwise stretchability increased to achieve the desired balance of direction extensibility. Generally the pretensioning or condensing is accomplished after the rubber-fabric uniting step but before the roll forming step.

Where it is necessary to pretension fabrics prior to the roll vulcanization to obtain a desired fabric extensibility balance, it is important to insure that the vulcanizing roll is formed with the alternating layers of rubbery layer coated fabric and sheet dielectric being relatively nonmovable. This condition, which may be obtained by controlling the tension exerted on the roll components during the roll formation, insures that the previously imparted fabric pretensioning or dimensional conditioning will be maintained during the embossing and vulcanizing step.

While the invention has been described with respect to a preferred specific embodiment, it will be understood that many modifications will occur to those skilled in the art and the invention is not limited to the details shown and described but is determined by the scope of the appended claims.

I claim:
1. The method of making a rubber-coated fabric material which comprises continuously feeding in a longitudinal direction a web of fabric material which in a relaxed state is extensible at least about 80% beyond any normal relaxed flatwise dimension, continuously feeding and pressing in a longitudinal direction into face-to-face adhering relationship with said fabric a freshly calendered web of uncured vulcanizable rubber, applying tension to sad fabric web as it is pressed against the freshly calendered web of uncured vulcanizable rubber, completely relaxing the resulting two-ply web in the longitudinal direction prior to vulcanization, controlling said tension in relation to the contraction of the rubber, so that, while relaxed, said fabric and web returns to its unstretched dimensions, and vulcanizing said rubber to form a strongly adhering composite material resiliently extensible at least 80% beyond any flatwise relaxed dimension of said composite material without substantial penetration of the rubber into the fabric.

2. A process according to claim 1 wherein said two-ply web prior to vulcanization is contacted on the free rubber surface with a sheet of dielectric material having on its surface a cameo fabriclike design and vulcanizing said rubber by heating to a vulcanization temperature for a time period requisite to vulcanize said rubber and to imprint said design on the surface of said rubber, the height of said cameo design and the pressing together of said two-ply web and said dielectric sheet being controlled to prevent distortion of, or damage to, said fabric.

References Cited by the Examiner
UNITED STATES PATENTS

| | | | |
|---|---|---|---|
| 2,353,525 | 7/1944 | Teague | 161—76 |
| 2,649,391 | 8/1953 | Alderfer | 117—162 |
| 2,677,872 | 5/1954 | Teague | 28—80 |
| 2,703,436 | 3/1955 | Rhee et al. | |
| 2,787,266 | 4/1957 | Scholl | 128—156 |
| 2,981,954 | 5/1961 | Garbellano | 2—2.1 |
| 3,028,279 | 4/1962 | Heberlein | 161—76 X |
| 3,127,306 | 3/1964 | Turton et al. | 161—89 |

EARL M. BERGERT, *Primary Examiner.*
CARL F. KRAFFT, *Examiner.*
R. J. CARLSON, T. R. SAVOIE, *Assistant Examiners.*